(12) United States Patent
Peev et al.

(10) Patent No.: US 9,197,738 B2
(45) Date of Patent: Nov. 24, 2015

(54) PROVIDING SELECTED DATA THROUGH A LOCKED DISPLAY

(75) Inventors: Igor Peev, Seattle, WA (US); Robert Pengelly, Seattle, WA (US); Bryan T. Agnetta, Seattle, WA (US); Adam Swank, Redmond, WA (US); Sumonto Ghosh, Redmond, WA (US); Liang Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 12/421,646

(22) Filed: Apr. 10, 2009

(65) Prior Publication Data

US 2010/0146384 A1 Jun. 10, 2010

Related U.S. Application Data

(60) Provisional application No. 61/119,810, filed on Dec. 4, 2008.

(51) Int. Cl.
*G06F 17/00* (2006.01)
*H04M 1/725* (2006.01)
(Continued)

(52) U.S. Cl.
CPC .......... *H04M 1/72586* (2013.01); *G06F 3/0481* (2013.01); *H04M 1/673* (2013.01); *H04M 2250/22* (2013.01)

(58) Field of Classification Search
CPC ... G06F 17/211; G06F 17/212; G06F 3/0481; G06F 9/4443; G09G 5/00
USPC ............................ 719/329; 715/864–867, 204
See application file for complete search history.

(56) References Cited

U.S. PATENT DOCUMENTS 6,243,724 B1   6/2001   Mander et al.
6,466,969 B1   10/2002  Bunney et al.
(Continued)

FOREIGN PATENT DOCUMENTS

EP   1569064 A1   8/2005
EP   1657898 A1   5/2006
(Continued)

OTHER PUBLICATIONS

S2 Applications for windows mobile, S2U Pertinent pages: S2U2 readme first, wayback machine page from Nov. 3, 2008. http://replay.waybackmachine.org/20100620050147/http://ac-s2.com/.*

(Continued)

*Primary Examiner* — Scott Baderman
*Assistant Examiner* — Howard Cortes
(74) *Attorney, Agent, or Firm* — Bryan Webster; Judy Yee; Micky Minhas

(57) ABSTRACT

Providing content and/or functionality through a display of a locked computing device. Configuration data defined by a user or application vendor identifies the content and/or functionality to be made available. Upon receipt of the content, the computing device modifies the received content based on the configuration data and provides the modified content to the user through the display of the locked computing device. The computing device also interacts with the user in accordance with the functionality identified by the configuration data. In some embodiments, notifications about voice mail or electronic mail messages are displayed to the user through a locked touch screen display. Responsive to a finger tap or other user input, additional yet limited information relating to the notifications is displayed.

20 Claims, 6 Drawing Sheets

(51) Int. Cl.
*G06F 3/0481* (2013.01)
*H04M 1/673* (2006.01)

(56) References Cited

U.S. PATENT DOCUMENTS

| | | | |
|---|---|---|---|
| 6,574,484 B1 | 6/2003 | Carley | |
| 7,120,865 B1 | 10/2006 | Horvitz et al. | |
| 7,231,231 B2 | 6/2007 | Kokko et al. | |
| 7,453,443 B2 | 11/2008 | Rytivaara et al. | |
| 7,516,884 B2 | 4/2009 | Chase-Salerno et al. | |
| 7,660,864 B2* | 2/2010 | Markki et al. | 709/207 |
| 7,881,283 B2* | 2/2011 | Cormier et al. | 370/352 |
| 2004/0085351 A1 | 5/2004 | Tokkonen | |
| 2004/0121823 A1 | 6/2004 | Noesgaard et al. | |
| 2004/0243682 A1* | 12/2004 | Markki et al. | 709/207 |
| 2005/0240880 A1 | 10/2005 | Banks et al. | |
| 2006/0003742 A1 | 1/2006 | Seligmann et al. | |
| 2006/0017692 A1 | 1/2006 | Wehrenberg et al. | |
| 2006/0129947 A1* | 6/2006 | Hamzy et al. | 715/790 |
| 2006/0161749 A1 | 7/2006 | Chen et al. | |
| 2006/0259537 A1* | 11/2006 | Emberton et al. | 709/200 |
| 2007/0014280 A1 | 1/2007 | Cormier et al. | |
| 2007/0028176 A1* | 2/2007 | Perdomo et al. | 715/741 |
| 2007/0107014 A1 | 5/2007 | Howard et al. | |
| 2007/0145680 A1 | 6/2007 | Rosenberg | |
| 2007/0150842 A1 | 6/2007 | Chaudhri et al. | |
| 2007/0207782 A1 | 9/2007 | Tran | |
| 2007/0260866 A1 | 11/2007 | Wang et al. | |
| 2007/0279419 A1 | 12/2007 | Seebach | |
| 2007/0280458 A1 | 12/2007 | Aberethy et al. | |
| 2007/0285390 A1* | 12/2007 | Yee et al. | 345/163 |
| 2007/0288582 A1* | 12/2007 | Major et al. | 709/207 |
| 2008/0020803 A1 | 1/2008 | Rios et al. | |
| 2008/0040688 A1 | 2/2008 | Hoffman et al. | |
| 2008/0086387 A1 | 4/2008 | O'Rourke et al. | |
| 2008/0094356 A1 | 4/2008 | Ording et al. | |
| 2008/0104595 A1 | 5/2008 | Kawachiya et al. | |
| 2008/0200142 A1 | 8/2008 | Abdel-Kader et al. | |
| 2008/0220752 A1* | 9/2008 | Forstall et al. | 455/415 |
| 2009/0137284 A1* | 5/2009 | Liyanaarachchi | 455/567 |
| 2009/0149203 A1* | 6/2009 | Backholm et al. | 455/466 |
| 2009/0265763 A1* | 10/2009 | Davies et al. | 726/3 |
| 2009/0282130 A1 | 11/2009 | Antoniou et al. | |
| 2009/0282485 A1 | 11/2009 | Bennett | |
| 2009/0284482 A1 | 11/2009 | Chin | |
| 2009/0288032 A1 | 11/2009 | Chang et al. | |
| 2010/0017759 A1 | 1/2010 | Birnbaum et al. | |
| 2010/0060586 A1* | 3/2010 | Pisula et al. | 345/169 |
| 2010/0079380 A1 | 4/2010 | Nurmi | |
| 2010/0081414 A1 | 4/2010 | Poisner | |
| 2010/0123724 A1 | 5/2010 | Moore et al. | |
| 2010/0146235 A1 | 6/2010 | Weber et al. | |
| 2010/0146384 A1 | 6/2010 | Peev et al. | |
| 2010/0146437 A1 | 6/2010 | Woodcock et al. | |
| 2010/0159995 A1 | 6/2010 | Stallings et al. | |
| 2010/0273457 A1 | 10/2010 | Freeman et al. | |
| 2011/0004845 A1 | 1/2011 | Ciabarra | |

FOREIGN PATENT DOCUMENTS

| | | | |
|---|---|---|---|
| EP | 1953663 A1 | 8/2008 | |
| JP | 2007-235844 A | 9/2007 | |
| JP | 2007274240 A | 10/2007 | |
| JP | 2007295176 A | 11/2007 | |
| JP | 2008053988 | 3/2008 | |
| JP | 2008-236184 A | 10/2008 | |
| JP | 2008-288924 A | 11/2008 | |
| JP | 2009188549 A | 8/2009 | |
| KR | 20060016426 A | 2/2006 | |
| KR | 100673163 B1 | 1/2007 | |
| KR | 1020070024165 A | 3/2007 | |
| KR | 100722278 B1 | 5/2007 | |
| RU | 2286016 C2 | 10/2006 | |
| RU | 2319314 C2 | 3/2008 | |
| TW | 200844843 A | 11/2008 | |

OTHER PUBLICATIONS

Desktop Lock 7.2.1 , TopLang Software Pertinent page: wayback machine Main Desktop Lock page Oct. 12, 2008 http://replay.waybackmachine.org/20081012104906/http://www.toplang.com/desktoplock.htm.*
Thomas, Review: IntelliScreen 1.05, 69/22/2008, iSource.com, pp. 2-9.*
Thomas, Intelliscreen 2.1—Hello Quickview!, Jan. 9, 2008, iSource.com, pp. 2-3.*
IntelliScreen 2.2 for iPhone 2.1/3G Firmware Released! No Author, Sep. 27, 2008, pp. 1-2.*
Brooke, IntelliScreen 1.00-1.03, Jun. 5, 2008, Apple iPhone School, pp. 1-2 Retrieved: http://www.appleiphoneschool.com/2008/06/05/intelliscreen-101/.*
"Sunscape—Slide to Lock/Unlock Utility", Retrieved at <<http://www.1800pocketpc.com/2008/09/01/sunscape-slide-to-lock-unlock-utility.html>>, Sep. 1, 2008, pp. 8.
"Organic Lock 0.8.1.5", Retrieved at <<http://www.1800pocketpc.com/2008/05/30/organic-lock-0815-an-almost-android-like-unlock-utility-for-pocketpc.html>>, May 30, 2008, pp. 7.
"ThrottleLock 0.3", Retrieved at <<http://www.1800pocketpc.com/2008/08/31/throttlelock-03-pattern-based-lock-like-on-android.html>>, Aug. 31, 2008, pp. 7.
"Slide to Unlock 2 [S2U2] 1.50d—iphone like Slide to Lock Unlock for Windows Mobile", Retrieved at <<http://www.1800pocketpc.com/2009/02/26/slide-to-unlock-2-s2u2-150d-iphone-like-slide-to-lock-unlock-for-windows-mobile.html>>, Feb. 26, 2009, pp. 8.
Multicellphone, "TalkLock by CellAvant—Free TouchScreen Lock App for BlackBerry Storm", Retrieved at <<http://www.multicellphone.com/talklock-by-cellavant-free-touchscreen-lock-app-for-blackberry-storm/>>, Jan. 5, 2009, pp. 5.
"PocketShield v1.1.3: PPC Software", Retrieved at <<http://ppcmobiles.blogspot.com/2008/11/pocketshield-v113-ppc-software.html>>, Mar. 2, 2009, pp. 6.
Deleon, Nicholas, "Slide 2 Unlock: Slide to Unlock Any Pocket PC", Retrieved at <<http://www.crunchgear.com/2007/06/08/slide-2-unlock-slide-to-unlock-any-pocket-pc/>>, Jun. 8, 2007, pp. 8.
"International Search Report", Mailed Date: Jul. 15, 2010, Application No. PCT/US2009/066601, Filed Date: Dec. 3, 2009, pp. 8.
"Intelliborn—Everyday Problems, Everyday Solutions", Retrieved at <<http://web.archive.org/web/20080516231423/http://www.intelliborn.com/>>, Retrieved Date: Sep. 6, 2011, pp. 2.
"Pop-Up Email Notifications", Retrieved at <<http://modmyi.com!forurns/3rd-party-apps-requests/414421-pop-up-email-notifications.html>>, Retrieved Date: Sep. 6, 2011, pp. 4.
"Intelliborn—IntelliScreen FAQs", Retrieved at <<http://web.archive.org/web/20080517141928/http://www.intelliborn.com/IntelliScreenFAQs.html>>, Retrieved Date: Sep. 5, 2011, pp. 3.
Non-Final Office action, Mailed Date Aug. 31, 2011, U.S. Appl. No. 12/474,281.
Non-final Office action, Mailed Date Jun. 28, 2011, U.S. Appl. No. 12/430,901.
Final Office action, Mailed Dated Aug. 19, 2011, U.S. Appl. No. 12/430,901.
"Gumballtech", Retrieved at <<http://www.gumballtech.com/2009/11/21/iphone-lockscreen-battle-lockinfo-vs-cydgets-v>>, Retrieved Date: Nov. 17, 2011, pp. 12.
"Definition of Capture", Retrieved at <<http://www.merriam-webster.com/dictionary/capture>>, Retrieved Date: Jan. 12, 2012, pp. 3.
"Advisory Action in U.S. Appl. No. 12/430,901", Dated: Dec. 9, 2011, pp. 4.
"Final Office Action in U.S. Appl. No. 12/474,281", Dated: Jan. 17, 2012, pp. 32.
"First Office Action in China Patent Application No. 200980149061.1", Dated: Apr. 16, 2012, pp. 8.
"Second Office Action in China Patent Application No. 200980149061.1", Dated: Sep. 11, 2012, pp. 6.
"Advisory Action in U.S. Appl. No. 12/430,901", Dated: Oct. 5, 2012, pp. 3.

(56) References Cited

OTHER PUBLICATIONS

"Final Rejection in U.S. Appl. No. 12/430,901", Dated: Aug. 6, 2012, pp. 32.
"What is the Gobbler?—Yahoo! for Teachers", Retrieved at <<http://help.yahoo.com/l/us/yahoo/teachers/teachers-237717.html#, Apr. 2009, pp. 1.
"S2U2 (Slide 2 Unlock 2)", Retrieved at <<http://web.archive.org/web/20081019021449/http://s2u2.eqvipage.dk/S2U2-index.html>>, Oct. 2008, pp. 3.
"S2 Applications for Windows Mobile", Retrieved at <<http://67.43.3.117/~acs2co/S2U2-readme.html>>, Aug. 6, 2010, pp. 3.
"Spb Mobile Shell 2.1 User Manual", Retrieved at <<http://www.spbsoftwarehouse.com/products/mobileshell/Spb%20Mobile%20Shell%20User%20Manual.pdf>>, 2008, pp. 1-21.
Martellaro, John, "Security Flaw Allows Access to Screen Locked iPhone", Retrieved at <<http://www.ipodobserver.com/story/37028>>, Aug. 27, 2008, pp. 3.
"Warden Security for Windows Mobile Smartphone", Retrieved at <<http://store.handmark.com/p/2086//Warden-Security-for-Windows-Mobile-Smartphone/->>, Retrieved Date: Nov. 6, 2008, pp. 6.
"Program Lock Pro v2.12e", Retrieved at <<http://www.fileheap.com/software-program-lock-pro-download-26198.html>>, Apr. 8, 2007, pp. 3.
"Non-Final Rejection in U.S. Appl. No. 12/430,901", Dated: Jan. 30, 2012, pp. 33.
Miller, Matthew, "Apple Files Notification Screen Patent, Is this Really that Unique?", Retrieved at <<http://blogs.zdnet.com/cellphones/?=122>>, Sep. 19, 2008, p. 1.
Chewar, et al., "Unpacking Critical Parameters for Interface Design: Evaluating Notification Systems with the IRC Framework", Retrieved at <<http://citeseerx.ist.psu.edu/viewdoc/download?doi=10.1.1.74.5721&rep=rep1&type=pdf>>, Aug. 1-4, 2004, Cambridge, Massachusetts, USA, pp. 10.
Matthews, et al., "Designing Glanceable Peripheral Displays", Retrieved at <<http://www.eecs.berkeley.edu/Pubs/TechRpts/2006/EECS-2006-113.pdf>>, Sep. 7, 2006, pp. 11.
Dantzich, et al., "Scope: Providing Awareness of Multiple Notifications at a Glance", Retrieved at <<http://citeseerx.ist.psu.edu/viewdoc/download?doi=10.1.1.4.5200&rep=rep1&type=pdf>>, 2002, pp. 11.
Miller, et al., "The InfoCanvas: Information Conveyance through Personalized, Expressive Art", Retrieved at <<http://www.cc.gatech.edu/~john.stasko/papers/chi01.pdf>>, Apr. 2001, pp. 2.
Cadiz, et al., "Sideshow: Providing Peripheral Awareness of Important Information", Retrieved at <<http://research.microsoft.com/research/coeUSideshowITRs/01-83.pdf>>, Sep. 14, 2001, pp. 9.
Zhang, et al., "Info-Lotus: A Peripheral Visualization for Email Notification", Retrieved at <<http://research.microsoft.com/acid/infolotus.pdf>>, Apr. 2-7, 2005, Portland, Oregon, USA, pp. 4.
"Intelliborn", Retrieved at <<http://web.archive.org/web/20080516231423/http://www.intelliborn.com>>, Sep. 6, 2011, pp. 2.
"Advisory Action in U.S. Appl. No. 12/474,281", Dated: Mar. 30, 2012, pp. 4.
"International Search Report", Mailed Date: Jun. 16, 2010, Application No. PCT/US2009/064869, Filed Date: Nov. 17, 2009, pp. 11.
"First Office Action in China Patent Application No. 200980149001.X", Dated: Mar. 31, 2012, pp. 6.
"Second Office Action in China Patent Application No. 200980149001.X", Dated: Sep. 6, 2012, pp. 6.
"Third Office Action in China Patent Application No. 200980149001.X", Dated: Oct. 18, 2012, pp. 6.
Sacco, AI., "Six Essential Apple iPhone Security Tips", Available at: <http://www.techworld.com.au/article/263077/six_essentialapple_iphone_security_tips?fp=4&fpid=303>, Oct. 8, 2008, pp. 3.
"Notice of Allowability", U.S. Appl. No. 12/474,281, Mailed Date: Nov. 19, 2012, filed May 29, 2009, pp. 9.
"Notice of Allowability", Application No. 200980149001.X, Mailed Date: Jan. 23, 2013, Filed Date: Nov. 17, 2009, pp. 8.
"European Search Report", Application No. EP/09/83/0844, Mailed Date: Feb. 13, 2013, Filed Date: Nov. 17, 2009, pp. 7.
Sadun Erica, "Taking Your iPod touch to the Max", Mar. 28, 2008, Retrieved at<<http://techbus.safaribooksonline.com/book/hardware-and-gadgets/9781590599877>>, pp. 4.
"Notice of Allowance in China Application No. 200980149061.1", Mailed Date: Jan. 15, 2013, filed Dec. 3, 2009, pp. 6.
"Non-final Office Action in U.S. Appl. No. 12/430,901", Mailed Date: Jun. 28, 2011, filed Apr. 28, 2009, pp. 24.
"Final Office Action in U.S. Appl. No. 12/430,901", Mailed Date: Sep. 19, 2011, filed Apr. 28, 2009, pp. 28.
"Office Action in Japan Application No. 2011-539701", Mailed Date: Jul. 3, 2013, Filed Date: Sep. 11, 2013, pp. 6.
"Non-Final Office Action for U.S. Appl. No. 12/430,901", Mailed Date: Jun. 13, 2013, 39 pages.
"Office Action for Mexican Patent Application No. MX/a/2011/005928", with English summary, Mailed Date: Mar. 26, 2013, 4 pages.
"Office Action for Russian Patent Application No. 2011122602", with English summary, Mailed Date: Nov. 27, 2013, 7 pages.
"Final Office Action for U.S. Appl. No. 12/430,901", Mailed Date: Nov. 21, 2013, 36 pages.
"Final Office Action for Japanese Patent Application No. 2011-539701", with English summary, Mailed Date: Dec. 25, 2013, 6 pages.
"Notice of Allowance for European Patent Application No. 09830844.8", Mailed Date: Dec. 10, 2013, 36 pages.
"Advisory Action for U.S. Appl. No. 12/430,901", Mailed Date: Feb. 10, 2014, 5 pages.
"Notice of Allowance for Japanese Patent Application No. 2011-539564", Mailed Date: Nov. 25, 2013, 8 pages.
"Notice of Allowance for Russian Patent Application No. 2011122658", with English summary, Mailed Date: Nov. 13, 2013, 15 pages.
Notice of Allowance for Mexican Patent Application No. MX/a/2011/005928, Mailed Date: Aug. 21, 2013, 3 pages.
"Office Action for Australian Patent Application No. 2009322760", Mailed Date: Mar. 7, 2014, 3 pages.
Thomas, "Review: Intelliscreen 1.05 iSource", Retrieved at <http://isource.com/2008/06/22/review-intelliscreen-105/>>, Jun. 22, 2008, 10 pages.
Thomas, "Intelliscreen 2.1—Hello Quickview Source", Retrieved at <<http://isource.com/2008/09/01/intelliscreen-21-helloquickview/>>, Sep. 1, 2008, 4 pages.
"IntelliScreen 2.2 for iPhone 2.1/3G Firmware Released!", Retrieved at <<http://web.archive.org/web/20080927061220/http://www.intelliborn.com/>>, Retrieved Date: Dec. 23, 2011, 3 pages.
"Desktop Lock 7.2.1", Retrieved at <<http://replay.waybackmachine.org/20081012104906/http://www.toplang.com/desktoplock.htm>>, TopLang Software Pertinent page: wayback machine Main Desktop Lock page, Oct. 12, 2008, 2 pages.
"Supplementary Search Report Issued in European Patent Application No. 09831125.1", Mailed Date: Apr. 1, 2014, 7 Pages.
"Office Action Issued in Australian Patent Application No. 2009322286", Mailed Date: May 28, 2014, 4 Pages.
"Notice of Allowance Issued in Russian Patent Application No. 2011122602", Mailed Date: Jul. 18, 2014, 17 Pages.
"Office Action Issued in Russian Patent Application No. 2011122602", Mailed Date: Apr. 15, 2014, 3 Pages. (w/o English Translation).
"Office Action Issued in Australia Patent Application No. 2009322286", Mailed Date: Mar. 25, 2014, 3 Pages.
"Notice of Allowance Issued in Australia Patent Application No. 2009322286", Mailed Date: Jul. 25, 2014, 2 Pages.
"Notice of Allowance Issued in Japan Patent Application No. 2011-539701", Mailed Date: Aug. 8, 2014, 4 Pages.
"Office Action Issued in Israel Patent Application No. 212301", Mailed Date: Nov. 3, 2014, 3 Pages. (Without English Translation).

(56) References Cited

OTHER PUBLICATIONS

"Capture—Definition and More from the Free Merriam-Webster Dictionary", Retrieved on: Jan. 5, 2012, Available at: https://web.archive.org/web/20120119092301/http://www.merriam-webster.com/dictionary/capture, 3 pages.

"Notice of Allowance Issued in Australian Patent Application No. 2009322760", Mailed Date: May 2, 2014, 2 Pages.

"Office Action Issued in Israel Patent Application No. 212300", Mailed Date: Dec. 10, 2014, 2 Pages. (Without English Translation).

"Office Action and Search Report Issued in Taiwan Patent Application No. 98139599", Mailed Date: Oct. 20, 2014, 13 Pages.

\* cited by examiner

PROVIDING SELECTED DATA THROUGH A LOCKED DISPLAY

CROSS-REFERENCE TO RELATED APPLICATION

This application claims the benefit of U.S. Provisional Application No. 61/119,810, filed Dec. 4, 2008, the entirety of which is hereby incorporated by reference herein.

BACKGROUND

Visual interfaces such as touch screens are available on most electronic devices, including mobile telephones with integrated personal digital assistant (PDA) features. The touch screens display graphics and text and enter commands to control the devices or to perform various other functions to execute operations on the device. Many screens, whether touch sensitive or not, automatically lock to prevent unintentional data entry.

However, when notifications about electronic mail messages or text messages are received by the device, the locked device prevents user interaction with the notifications until the user unlocks the device (e.g., after entering an unlock code). With existing systems, the user is unable to view, let alone interact with, the notifications with the device locked.

SUMMARY

Embodiments of the invention enable user interaction with content and/or functionality through a locked user interface of a computing device. Configuration data describing content to present to a user through a display of a locked computing device is defined. The computing device receives one or more content items while the computing device is locked. Based on the configuration data, the received content items are transformed. The transformed content items are provided to the user through the display of the locked computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
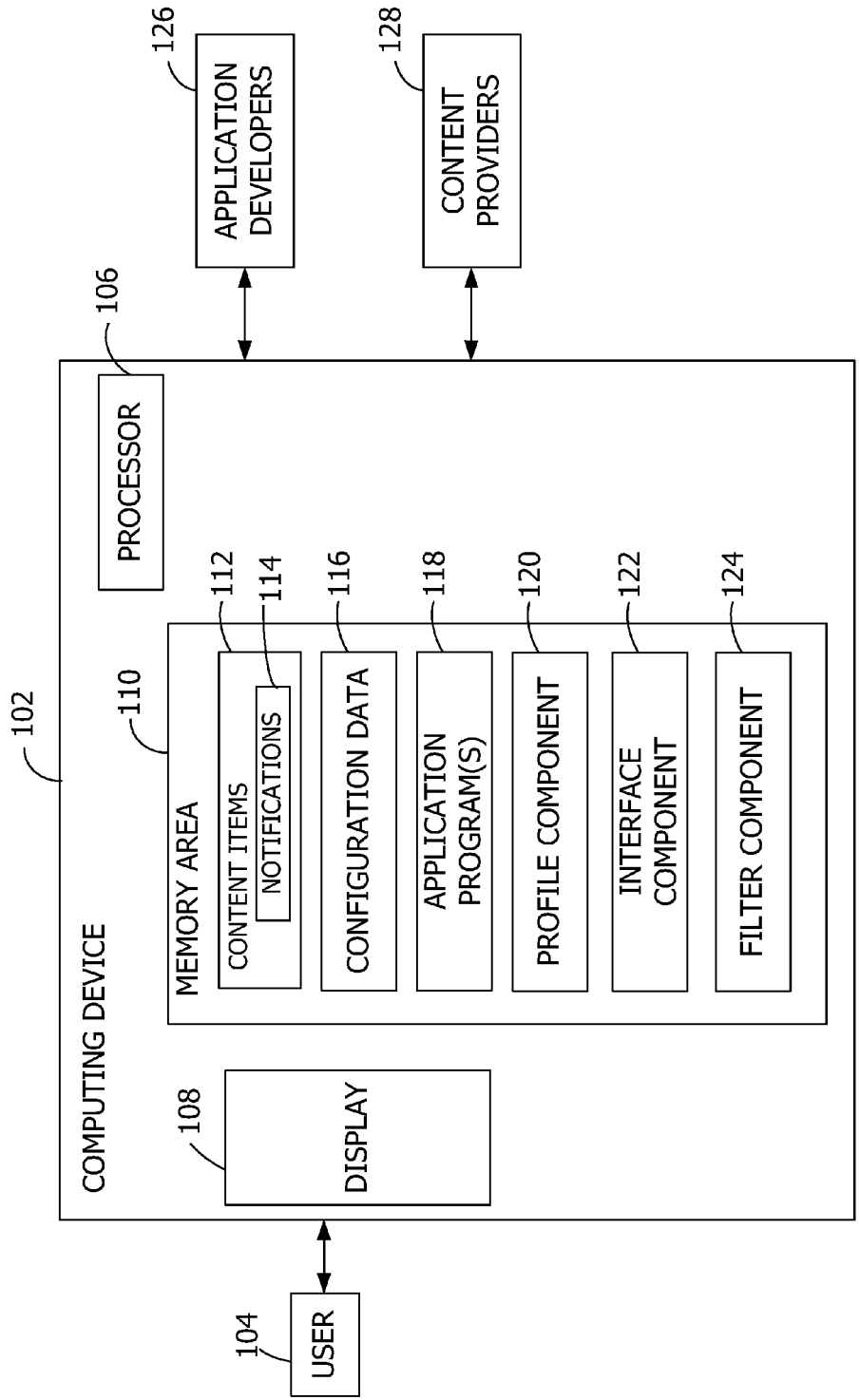
FIG. 1 is an exemplary block diagram illustrating a computing device delivering modified content from content providers to a user.

Referring to the figures, embodiments of the disclosure enable, at least, content and functionality to be selectively surfaced through a display 108 of a locked computing device 102 to improve the user experience with the computing device 102. The content includes data for consumption by a user 104 as well as data corresponding to functionality available to the user 104 while the computing device 102 is locked. By selectively displaying information through the display 108 of the locked computing device 102, the user 104 is able to view streams of notifications 114 and other content items 112 at a glance. By enabling selected functionality, the user 104 is able to interact with the locked computing device 102 without having to unlock the computing device 102 to manipulate the content items 112 or obtain additional information. Configuration data 116 specifies the content and functionality to be available through the display 108 of the locked computing device 102.

Referring again to FIG. 1, an exemplary block diagram illustrates the computing device 102 delivering customized or otherwise modified content from content providers 128 to the user 104. The computing device 102 includes at least a memory area 110, the display 108, and a processor 106. The memory area 110, or other computer-readable media, stores one or more of the content items 112. The content items 112 are received by the computing device 102 while the computing device 102 is locked. The content items 112 include any data received by the computing device 102 from, for example, content providers 128. In some embodiments, the content items 112 include notifications 114 relating to one or more of the following: an electronic mail message, a voice mail message, a text message, and a missed telephone call. In other embodiments, the content items 112 include news alerts, weather alerts, sports score updates, stock price alerts, transportation schedules (e.g., airline delays or train schedules), instant or chat messages, social networking updates, and the like.

The memory area 110 further stores the configuration data 116. The configuration data 116 describes the content items 112 and/or functionality to present to the user 104 when the computing device 102 is locked. The configuration data 116 includes, for example, a file or metadata describing a characteristic, type, category, classification, or other descriptor of the content items 112 that are to be presented to the user 104 through the display 108 of the locked computing device 102. The configuration data 116 may also identify particular applications or functions (e.g., within applications) that are available for execution by the user 104 through the display 108 of the locked computing device 102. In general, the functionality available through the display 108 of the locked computing device 102 is a subset of the functionality available to the user 104 after the computing device 102 has been unlocked.

The configuration data 116 may be stored in one or more data structures of any form. The configuration data 116 may be plain text, encrypted, binary, or any other form. Additionally, the configuration data 116 may be organized into a hierarchy, with some criteria applying to one or more of the content items 112, or to one or more of the application programs 118 available to the computing device 102.

The configuration data 116 may be defined by the user 104. In such embodiments, the user 104 identifies the particular functionality desired to be available through the display 108 of the locked computing device 102. For example, the user 104 may drag-and-drop applications into a particular region of the display 108 to select those applications to be available when the computing device 102 is locked. The selected applications may act as a toolbar on the display 108 of the locked computing device 102.

The configuration data 116 may also be defined by application developers 126. In such embodiments, the application developer 126 of each application identifies the functionality that remains available to the user 104 when the computing device 102 becomes locked. The configuration data 116 in this example accompanies the installation or downloading of the application to the computing device 102. The identified functionality may represent a default setting, and may be overridden by the user 104 in some embodiments.

The memory area 110, or one or more computer-readable media, further stores computer-executable components for implementing aspects of the disclosure. Exemplary components include a profile component 120, an interface component 122, and a filter component 124. These components are described below with reference to FIG. 3.

In general, the memory area 110 is associated with the computing device 102. For example, in FIG. 1, the memory area 110 is within the computing device 102. However, the memory area 110 or any of the data stored thereon may be associated with any server or other computer, local or remote from the computing device 102 (e.g., accessible via a network).

The display 108 includes any component for providing information to the user 104. For example, the display 108 includes any capacitive display capable of sensing touch input from the user 104 or another object such as a stylus. While aspects of the invention are described with reference to the display 108 being a touch sensitive or touch screen display, embodiments of the invention are operable with any display. For example, aspects of the invention are operable with non-touch sensitive displays such as found on devices that have a full or partial keyboard available for data entry. In such examples, the computing device 102 locks by disabling the keyboard from being used as a user input selection device for the computing device 102.

The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102 (e.g., by a cloud service 202 such as in FIG. 2). In some embodiments, the processor 106 is programmed to execute instructions such as those illustrated in the figures (e.g., FIG. 3).

While aspects of the invention are described with reference to the computing device 102 being a mobile computing device 402 such as a mobile telephone, embodiments of the invention are operable with any computing device. For example, aspects of the invention are operable with devices such as digital cameras, digital video cameras, laptop computers, gaming consoles (including handheld gaming consoles), portable music players, a personal digital assistant, an information appliance, and a personal communicator.

Some embodiments include the computing device 102 disconnected from a network. In such an embodiment, the content items 112 may include notifications 114 such as calendar or alarm alerts originating from the computing device 102 (e.g., not received from the network). Other embodiments contemplate the computing device 102 being connected to a network or cloud service 202, whether the connection is continuous or sporadic (e.g., as available), such as illustrated in FIG. 2.

Figure 2:
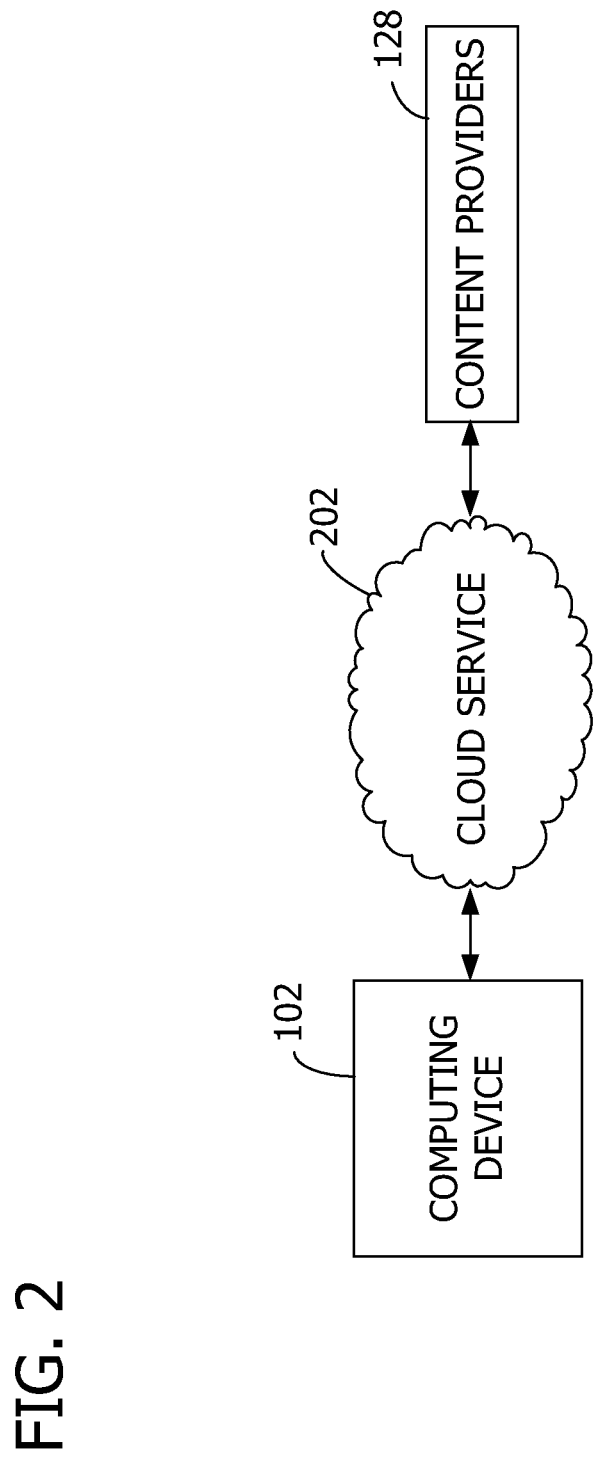
FIG. 2 is an exemplary block diagram illustrating a cloud service providing modified content from content providers to the computing device of the user.

Referring next to FIG. 2, an exemplary block diagram illustrates the cloud service 202 providing modified content from content providers 128 to the computing device 102 of the user 104. In the embodiment of FIG. 2, some of the operations performed by the computing device 102 in FIG. 1 are instead performed by the cloud service 202. For example, the cloud service 202 defines the configuration data 116, receives the content items 112 (e.g., from the content providers 128), and filters the content items 112. The cloud service 202 outputs the content items 112, after processing, to the computing device 102 for presentation to the user 104. Such an embodiment offloads the processing from the computing device 102 to the cloud service 202 to enable the computing device 102 to reduce the computational burden on the computing device 102 (e.g., improve response time, reduce power consumption, reduce heat generation) or reduce the hardware needs of the computing device 102 (e.g., less processing capability, less memory space, etc.).

Figure 3:
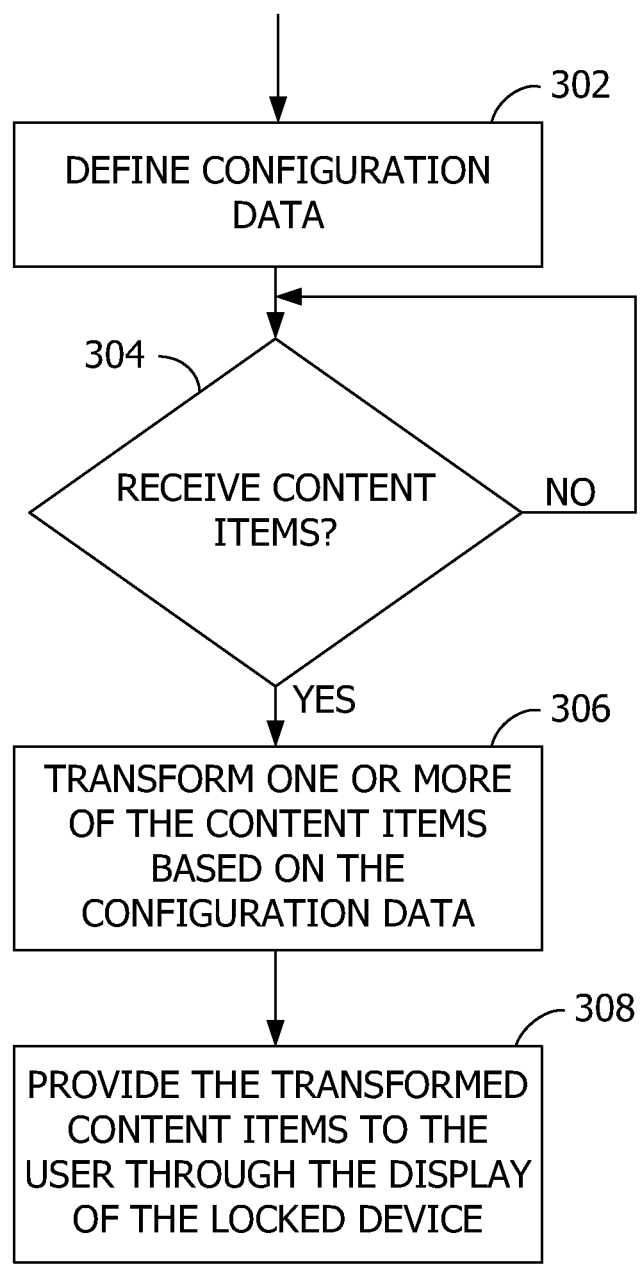
FIG. 3 is an exemplary flow chart illustrating the modification of the content based on configuration data associated with an application program.

Referring next to FIG. 3, an exemplary flow chart illustrates the modification of the content based on configuration data 116 associated with an application program 118. The configuration data 116 is defined at 302. The configuration data 116 describes content to present to the user 104 through the display 108 of the locked computing device 102. Alternatively or in addition, the configuration data 116 is received from the user 104 or from the application developers 126. The configuration data 116 includes, for example, identification of one or more of the following: the application program 118 associated with the content items 112, a type of notification 114 associated with the content items 112, a category of notification 114 associated with the content items 112, and a keyword associated with the content items 112.

One or more of the content items 112 are received or accessed at 304 while the computing device 102 is locked. The computing device 102 is locked such that full access to the capabilities of the computing device 102 is unavailable, user entry is disabled, or interaction by the user 104 with the computing device 102 is otherwise limited. In some embodiments, the locked computing device 102 may be unlocked through entry of one or more of the following: a code, a gesture, and a button press.

The received content items 112 are analyzed by transforming, altering, filtering, modifying, or the like at 306 based on the defined configuration data 116. For example, if the received content items 112 have one or more data fields associated therewith, transforming the received content items 112 includes selecting one or more of the data fields for presentation based on the defined configuration data 116. The selected data fields are then presented to the user 104. Alternatively, the data within one or more of the data fields may be selected or modified for presentation to the user 104.

The transformed content items 112 are provided to the user 104 through the display 108 of the locked computing device 102 at 308. In embodiments in which a subset of the content items 112 are selected for presentation such as when the transforming operation includes filtering the content items 112, only the filtered content items 112 are presented to the user 104.

In some embodiments, the content items 112 are associated with one or more application programs 118. When provided to the user 104 at 308, the content items 112 may be provided using the associated application program 118. Similarly, when the user 104 interacts with the provided content items 112 (e.g., selects one or more of the content items 112), the computing device 102 may unlock and automatically execute the application program 118 associated with the selected content items 112.

The computing device 102 may also display representations of the application programs 118 associated with the received content items 112 as a toolbar or other grouping. The representations include, for example, text or images (e.g., icons) corresponding to the application programs 118.

Further, the computing device 102 may enable a subset of functionality of each of the application programs 118 associated with the presented content items 112, as defined by the configuration data 116. The subset of functionality is enabled through the display 108 of the locked computing device 102. The user 104 interacts with the application programs 118 via the presented content items 112 in accordance with the enabled subset of functionality.

For example, if an electronic mail message is received (e.g., the content item 112), the transformation at 306 may include selecting a sender field and a time stamp field to present to the user 104. The user 104 is then able to view the name or address of the person that sent the message, along with the time the message was sent. If the configuration data 116 specifies that limited functionality of a mail application is available, the user 104 may be able to view the subject field of the message without unlocking the computing device 102. However, in this example, if the user 104 wants to view the body of the message, the user 104 selects an icon on the display 108 corresponding to the mail application. Responsive to the selection, the computing device 102 is unlocked and the mail application is executed to present the body of the message to the user 104 (or present a list of the messages received by the mail application).

In some embodiments, the operations identified in FIG. 3 are embodied as computer-executable components or modules. In the example of FIG. 2, the components include the profile component 120, the interface component 122, and the filter component 124. The profile component 120 receives the configuration data 116 and stores the configuration data 116 in a data structure associated with the application program 118. The configuration data 116 describes content and functionality to present to the user 104 through the display 108 of the locked computing device 102. The interface component 122 receives the content items 112 while the computing device 102 is locked. The filter component 124 modifies the content items 112 received by the interface component 122 based on the configuration data 116 received by the profile component 120. In some embodiments, the filter component 124 identifies one or more of the content items 112 associated with a particular category, as specified by the configuration data 116. Example categories include electronic mail messages, voice mail messages, text messages, or any other type or kind of notification 114 or data received by the computing device 102.

The filter component 124 may also select the content items 112 having criteria specified by the configuration data 116. For example, the criteria may specify that only content items 112 originating from a particular content provider 128 (e.g., a particular friend of the user 104) be displayed through the display 108 of the locked computing device 102. In such an example, a parent in a business meeting defines, in the configuration data 116, that only content items 112 (e.g., calls, messages, etc.) from a child of the parent are to be displayed when the computing device 102 is locked.

The interface component 122 provides the modified content items 112 to the user 104 through the display 108 of the locked computing device 102. The filter component 124 enables the user 104 to interact with the provided content items 112 according to the functionality described by the configuration data 116.

Figure 4:
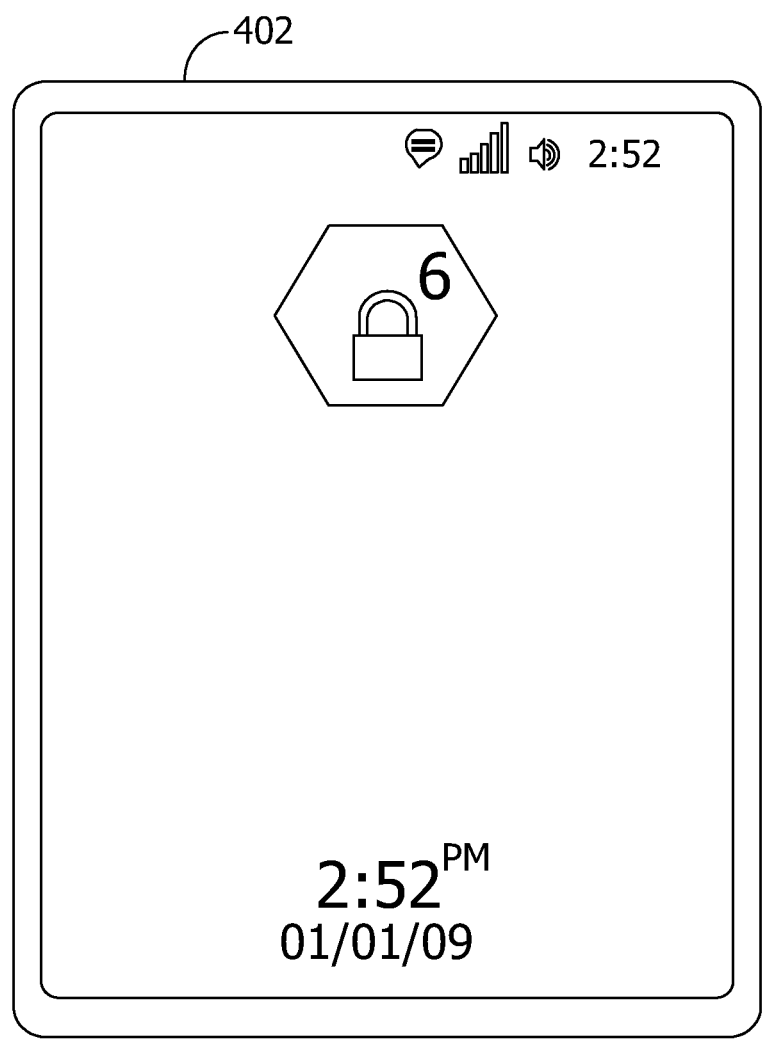
FIG. 4 is an exemplary block diagram illustrating a mobile computing device identifying a quantity of received notifications to the user.

Referring next to FIG. 4, an exemplary block diagram illustrates the mobile computing device 402 identifying a quantity of received notifications 114 to the user 104. In the exemplary user interface of FIG. 4, the mobile computing device 402 includes a touch sensitive display, and the mobile computing device 402 has been locked. For example, the mobile computing device 402 may be locked, for example, after an explicit command from the user 104 or after expiration of a predefined period of time.

When the user 104 presses the power button or performs another input to wake up the mobile computing device 402, the interface in FIG. 4 is displayed. A lock symbol indicates that data entry or other interaction with the mobile computing device 402 is limited. However, the value "6" displayed near the lock symbol indicates that the user 104 has received six new notifications 114 or other content items 112. The display 108 also presents other data such as the date, time, signal strength, battery indicator, etc.

Figure 5:
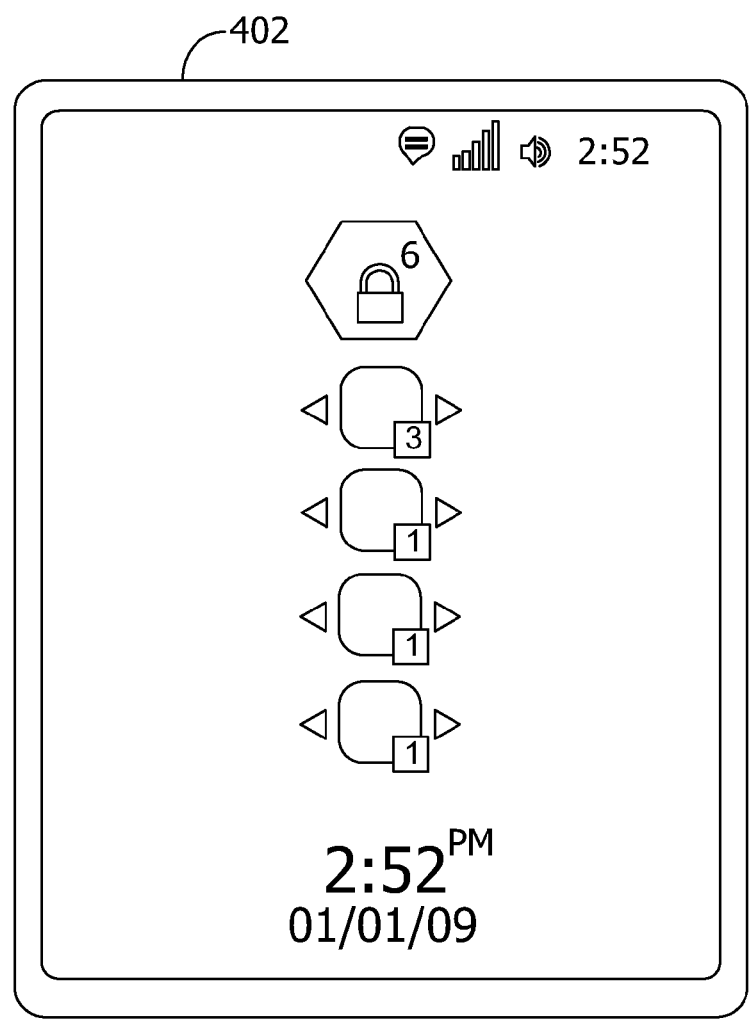
FIG. 5 is an exemplary block diagram illustrating the mobile computing device displaying icons corresponding to application programs having notifications.

Referring next to FIG. 5, an exemplary block diagram illustrates the mobile computing device 402 displaying icons corresponding to application programs 118 having notifications 114. Continuing with the example of FIG. 4, the user 104 desires to view information about the six new content items 112 received. The user 104 taps, for example, with a finger or stylus on the touch sensitive display, the lock symbol or anywhere else on the display 108. Several icons are then displayed, each corresponding to the application program 118 that has received a new content item 112. If there are more icons to display than can be displayed in the available display area, the user 104 can scroll through the list of icons. A quantity of the new content items 112 for each of the application programs 118 is displayed near each icon. In this example, the first application program 118 has three new content items 112, while the other three application programs 118 each have one new content item 112.

The mobile computing device 402 in FIG. 5 is still locked. The user 104 reviews the icons indicating new incoming content items 112 (e.g., notifications 114) in different categories such as messaging, missed calls, voice mail, texts and third party services. However, the user 104 may tap (e.g., double-tap, slide left, slide right, flick the icon, or perform another input gesture) on one of the icons to unlock the mobile computing device 402 and be taken to the application program 118 corresponding to the selected icon. At this point, full interaction with the application program 118 is enabled. In such embodiments, the user 104 does not explicitly unlock the mobile computing device 402, but rather the unlock operation and the execution of the application program 118 occur responsive to the gesture or command from the user 104. In other embodiments, the user 104 is directed to an unlock screen (e.g., PIN input screen) responsive to the input gesture from the user 104 to receive the unlock PIN from the user 104 before allowing the user 104 to fully access the application program 118.

Without fully unlocking the mobile computing device 402, however, the user 104 may be able to interact in a limited way with the displayed icons. The available limited interaction is defined in the configuration data 116. For example, while the mobile computing device 402 is still locked in the example of FIG. 5, the user 104 may obtain additional information about some of the content items 112 as described next with reference to FIG. 6.

Figure 6:
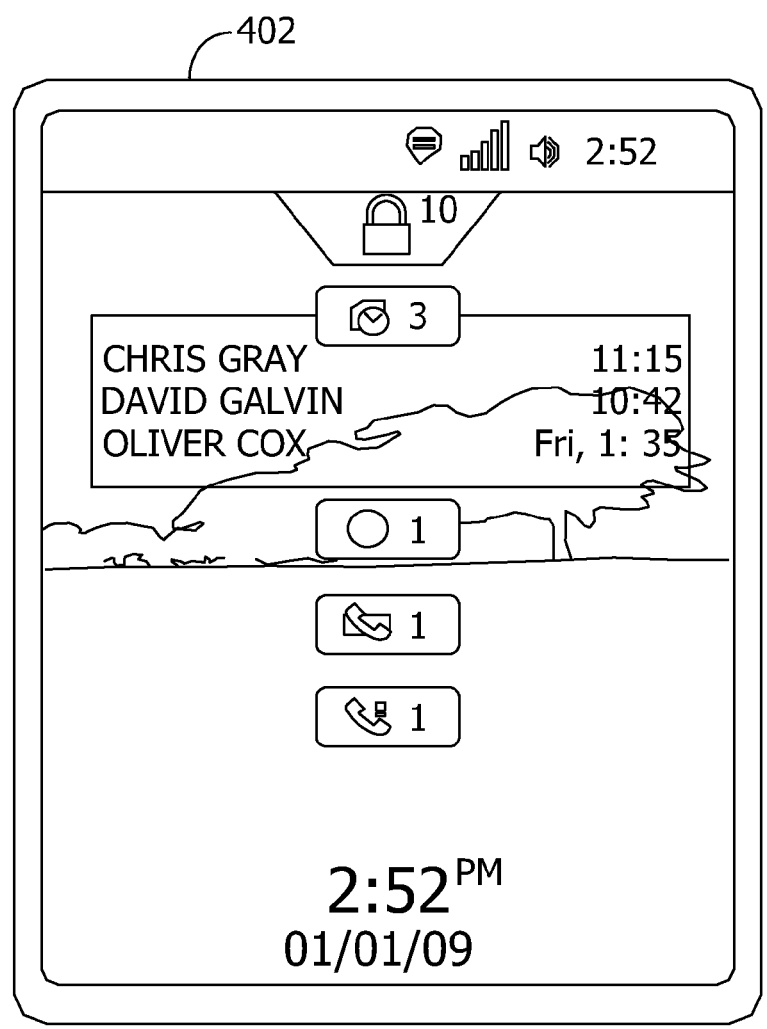
FIG. 6 is an exemplary block diagram illustrating the mobile computing device displaying the icons corresponding to application programs along with a brief summary of the notifications associated with one of the application programs.

Referring next to FIG. 6, an exemplary block diagram illustrates the mobile computing device 402 displaying the icons corresponding to application programs 118 along with a brief summary of the notifications 114 associated with one of the application programs 118. In the example of FIG. 6, the mobile computing device 402 is still locked. However, the user 104 has tapped or otherwise selected the first icon. For example, the user 104 may flick the icon in a particular direction. In response, additional information about the three new content items 112 is displayed. In this example, the sender and date/time of each of the content items 112 is displayed. However, in other embodiments, different or additional information may be displayed responsive to the selection by the user 104. For example, the mobile computing device 402 may display the subject line of each message, or only display the content items 112 that match the criteria defined by the configuration data 116 (e.g., only display messages received within the last ten minutes, or only display messages from a particular sender).

In the examples of FIG. 4, FIG. 5, and FIG. 6, the icons or other representations of the content items 112 have slider functionality. In the touch sensitive display embodiment, the user 104 touches one of the icons, and drags the icon to the left or right (or up or down) to perform an operation (e.g., reveal additional information, as specified by the configuration data 116).

In some embodiments, some of the content items 112 are displayed as full-screen notifications 114 rather than smaller icons. For example, content items 112 such as incoming calls or calendar appointment reminders are displayed full-screen. Such content items 112 may, however, offer user interaction similar to that of other, smaller icons. For example, the full-screen notifications 114 may be sliders that the user 104 can drag to reveal additional information. In the alarm example, one slider allows the user 104 to "snooze," while another slider allows the user 104 to "ignore" the alarm.

The user 104, the application developers 126, or other entities may customize various aspects of the presentation of the content items 112 to the user 104. Such customization may be stored in, for example, the configuration data 116. The customization includes, but is not limited to, one or more of the following: clock features, text font, text size, contrast, shadows, other artwork on the display 108, input keypad, or other dialogs. For example, the icons may be displayed as fish, rocks, or other objects, and there may be different layouts for portrait and landscape orientation of the mobile computing device 402.

In some embodiments, the content items 112 are received by the computing device 102. The content items 112 are routed internally in the computing device 102 to a router for handling incoming content items 112. A database or other data structure is updated with information describing the receipt of the content items 112. A service listens for updates to the database. Upon detection of the content items 112, a device registry is updated. A component implementing the lock screen listens for the updates to the device registry. Upon detection of an update to the device registry, the component updates the display of the locked computing device 102 with the received content items 112.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of each of the above storage media and communication media elements are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selectively presenting content to the user 104 through the locked display of the mobile computing device 402, and exemplary means for customizing, per application program 118, the presentation of content to the user 104 through the locked display of the mobile computing device 402.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for customizing notifications available through a display of a locked mobile computing device, said system comprising:
 a memory area for storing one or more notifications received by a mobile computing device while the mobile computing device is locked, said memory area further storing configuration data, said configuration data describing notifications to present to a user through a display of the locked mobile computing device and said configuration data further defining a subset of functions within an application program associated with one or more of the notifications, said subset of functions to be available for execution by the user while the mobile computing device is locked, said configuration data further identifying a keyword; and
 a processor programmed to:
  receive the configuration data from the user of the mobile computing device;
  access one or more of the notifications stored in the memory area;
  alter one or more of the accessed notifications based on the configuration data stored in the memory area, the processor being programmed to alter the accessed notifications by filtering the accessed notifications based on the keyword identified in the configuration data that specifies a limited functionality of the application program available without unlocking the mobile computing device;
  present the altered notifications to the user through the display of the locked mobile computing device;
  enable the subset of functions within the application program through the display while the mobile computing device is locked, whereby the user interacts with the application program via the presented altered notifications to perform at least one of the subset of functions within the application program while the mobile computing device remains locked; and
  obtain, responsive to the user interaction, additional information about the presented altered notifications based on the configuration data to perform the at least one of the subset of functions the mobile corn device remains locked.

2. The system of claim 1, wherein the configuration data describes characteristics of the notifications, the configuration data being defined by a developer of the application program, the subset of functions within the application program, that remain available to the user when the mobile computing device becomes locked, being identified by the developer of the application program.

3. The system of claim 1, wherein the processor is programmed to analyze each of the accessed notifications by filtering the accessed notifications based on the configuration data.

4. The system of claim 3, wherein the processor is programmed to present said one or more of the accessed notifications by presenting only the filtered notifications.

5. The system of claim 1, further comprising means for selectively presenting content to the user through the display of the locked mobile computing device.

6. The system of claim 1, further comprising means for customizing, per application program, the presentation of content to the user through the display of the locked mobile computing device.

7. The system of claim 1, wherein altering one or more of the accessed notifications based on the configuration data stored in the memory area comprises altering content associated with a notification such that the altered content is a subset of the content that would be displayed through a display of an unlocked mobile computing device.

8. A method comprising:
 accessing user-defined configuration data describing content to present to a user through a display of a locked computing device and said configuration data further defining a subset of functions of one or more application programs associated with the content, said subset of functions to be available to the user through the display of the locked computing device, said configuration data further identifying a keyword;
 receiving, by the computing device, one or more content items while the computing device is locked;
 transforming one or more of the received content items based on the accessed configuration data, the transforming comprising filtering the received content items based on the keyword identified in the configuration data that specifies a limited functionality of the one or more application programs available without unlocking the computing device;
 providing the transformed content items for presentation to the user through the display of the locked computing device;
 enabling the subset of functions of the application programs to be available through the display of the locked computing device, whereby the user interacts with one or more of the application programs via the provided, transformed content items; and
 obtaining, responsive to the user interaction, additional information about the transformed content items based on the configuration data to perform at least one of the subset of functions while the computing device remains locked.

9. The method of claim 8, further comprising:
 receiving from the user a selection of one of the provided content items; and
 responsive to the received selection, directing the user to an unlock screen before unlocking the locked computing device and executing the application program associated with the selected one of the content items.

10. The method of claim 9, further comprising responsive to the received selection, receiving a command from the user to unlock the locked computing device.

11. The method of claim 8, further comprising providing, through the display of the locked computing device, representations of one or more of the application programs available on the computing device, wherein the representations are provided as a toolbar.

12. The method of claim 11, further comprising:
 receiving a selection from the user of one of the provided representations; and
 responsive to the received selection, unlocking the locked computing device and executing the application program associated with the selected one of the content items.

13. The method of claim 8, wherein the user interaction with the one or more of the application programs unlocks the computing device without the user explicitly unlocking the computing device, and wherein accessing the user-defined configuration data comprises identifying one or more of the following: an application associated with the content items, a type of notification associated with the content items, and a category of notification associated with the content items.

14. The method of claim 8, wherein said accessing, said receiving, said transforming, and said providing are performed by a cloud service, and wherein providing the transformed content items comprises transmitting the transformed content items from the cloud service to the computing device for display to the user.

15. The method of claim 8, wherein the received content items have one or more data fields associated therewith, and wherein transforming the received content items comprises selecting one or more of the data fields based on the defined configuration data, and wherein providing the transformed content items comprises providing only the selected data fields while the computing device remains locked.

16. The method of claim 8, wherein defining the configuration data comprises receiving the configuration data when installing the application program on the computing device.

17. One or more computer storage media having computer-executable components, said components comprising:
- a profile component for receiving, from a user, configuration data describing content to present to the user through a display of a locked computing device and said configuration data further defining a subset of functions of an application program associated with the content, said subset of functions to be available to the user through the display of the locked computing device, said application program executing on the computing device, wherein the profile component stores the received configuration data in a data structure associated with the application program;
- an interface component for receiving one or more content items while the computing device is locked; and
- a filter component for modifying the content items received by the interface component based on the configuration data received by the profile component and stored in the data structure, the modifying comprising filtering the content items based on a criteria specified by the configuration data, the criteria specifying content items originating from a particular content provider that are not allowed to be displayed through the display of the locked computing device and are allowed to be displayed through a display of an unlocked computing device, wherein the interface component provides the modified content items to the user through the display of the locked computing device, and wherein the filter component enables the user to interact with the provided content items to perform at least one of the subset of functions defined by the configuration data while the computing device remains locked and directs the user to an unlock screen, in response to the user interaction with the provided content items, before allowing performance of functions other than the subset of functions defined by the configuration data.

18. The computer storage media of claim 17, wherein the profile component receives the configuration data from a developer of the application program.

19. The computer storage media of claim 17, wherein the application program relates to one or more of the following: stock prices, sports scores, transportation schedules, instant messages, and social networking messages.

20. The computer storage media of claim 17, wherein the configuration data identifies a category associated with one or more of the content items, and wherein the interface component provides the content items associated with the identified category to the user through the display of the locked computing device.

\* \* \* \* \*